Feb. 12, 1952    C. W. SHERWIN ET AL    2,585,855
RADAR GROUND-CONTROLLED APPROACH SYSTEM FOR AIRCRAFT
Filed Aug. 11, 1944    3 Sheets-Sheet 1
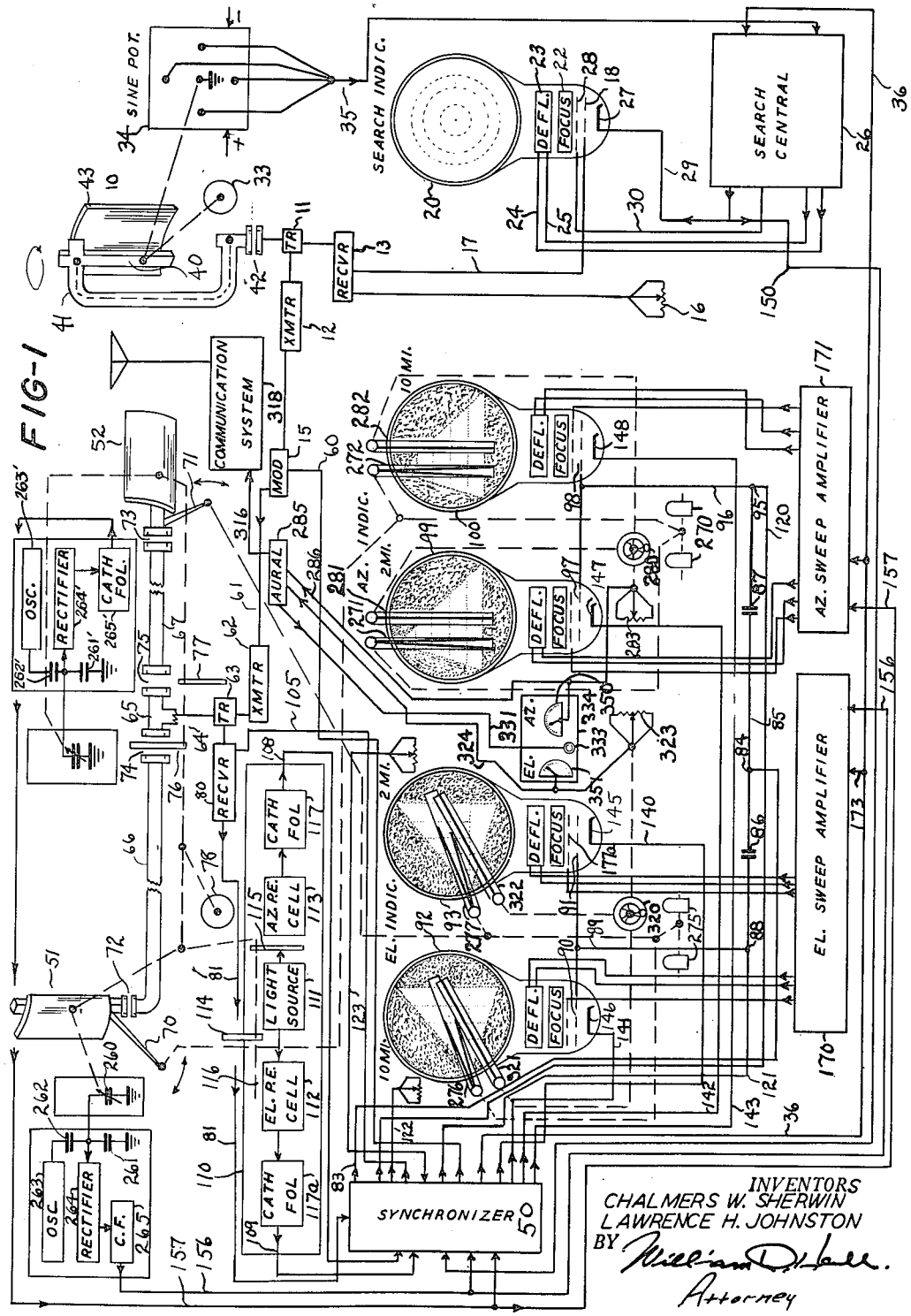
INVENTORS
CHALMERS W. SHERWIN
LAWRENCE H. JOHNSTON
BY
Attorney Feb. 12, 1952     C. W. SHERWIN ET AL     2,585,855
RADAR GROUND-CONTROLLED APPROACH SYSTEM FOR AIRCRAFT
Filed Aug. 11, 1944     3 Sheets-Sheet 2
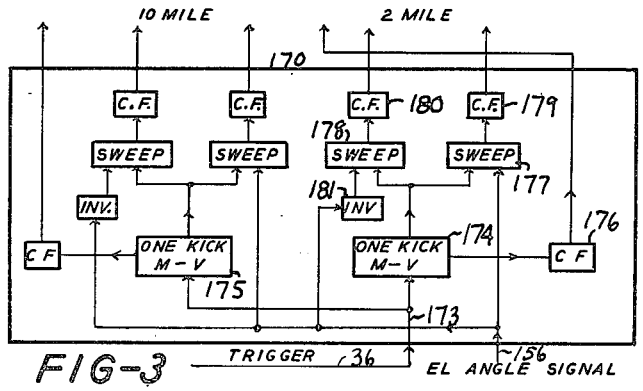
FIG-3
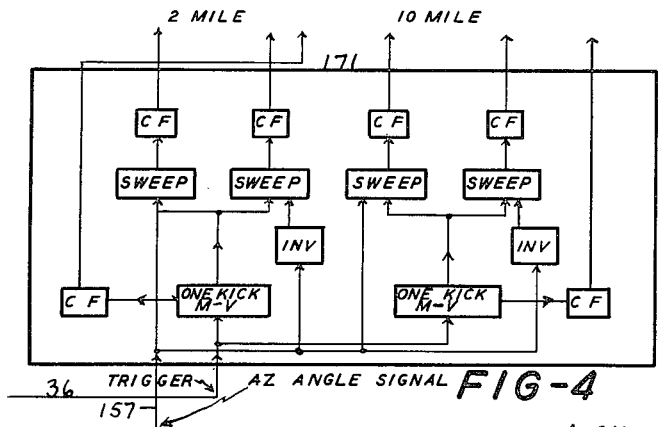
FIG-4
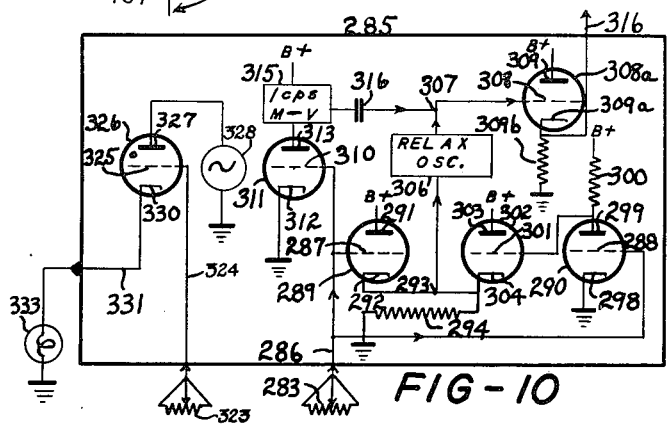
FIG-10
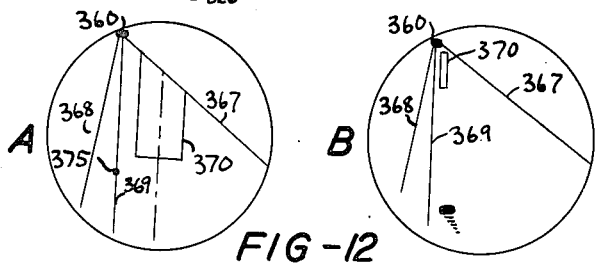
FIG-12
FIG-11
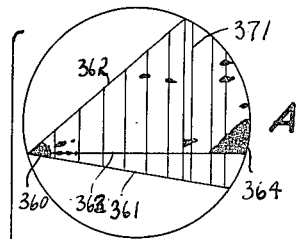
A
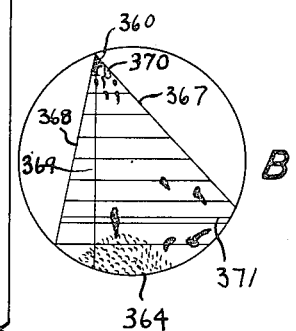
B
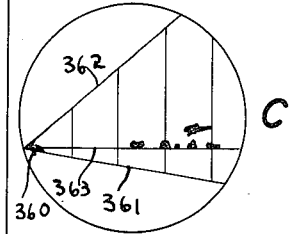
C
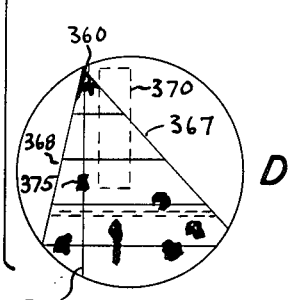
D
INVENTORS
CHALMERS W. SHERWIN
LAWRENCE H. JOHNSTON
BY
William D. Hall
Attorney

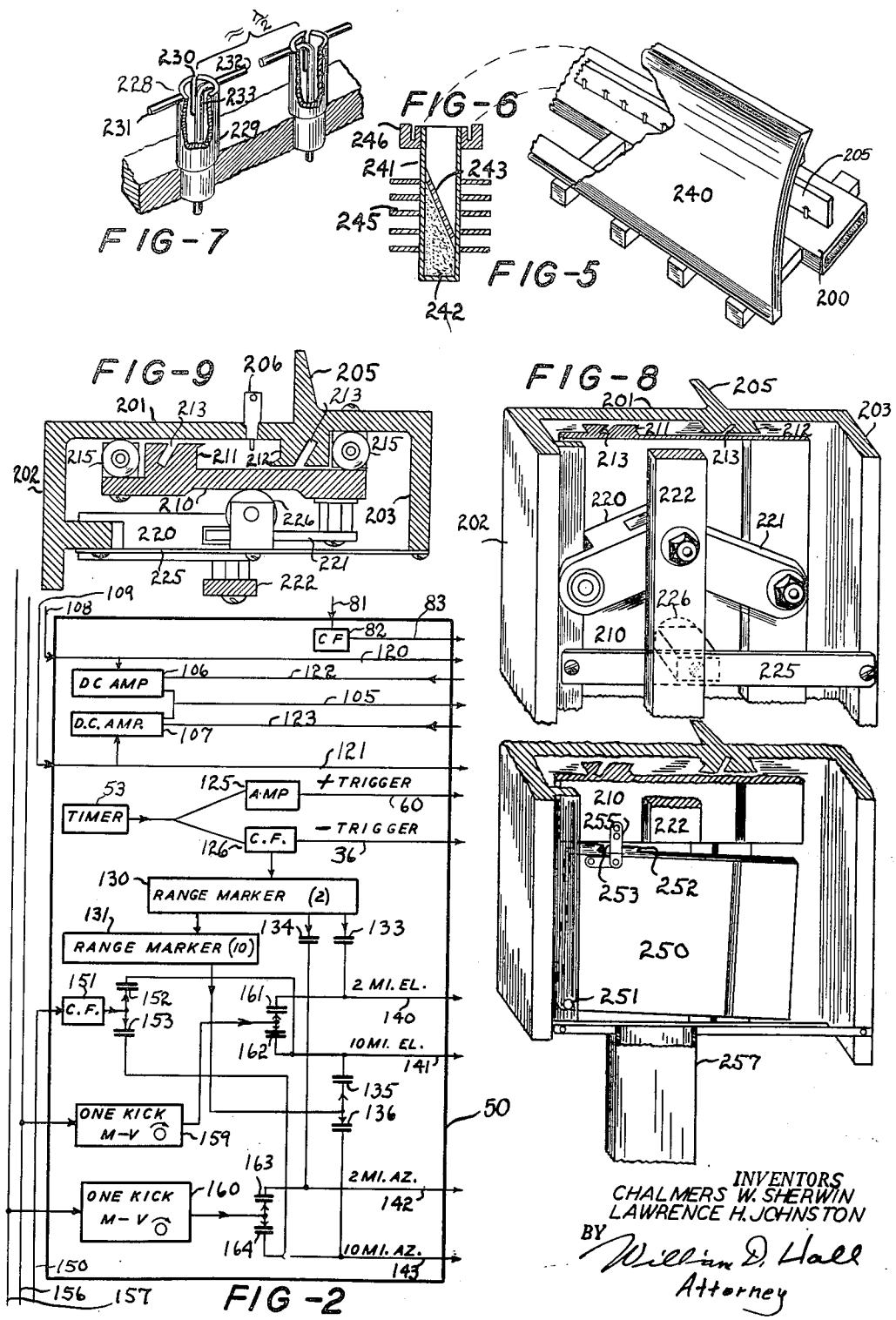

Patented Feb. 12, 1952

2,585,855

UNITED STATES PATENT OFFICE 2,585,855

RADAR GROUND-CONTROLLED APPROACH SYSTEM FOR AIRCRAFT

Chalmers W. Sherwin, Belmont, Mass., and Lawrence H. Johnston, Santa Fe, N. Mex., assignors, by mesne assignments, to the United States of America as represented by the Secretary of War Application August 11, 1944, Serial No. 549,044

18 Claims. (Cl. 343—11)

This invention relates to a communication system and particularly to a system for controlling landing of aircraft. The invention hereinafter disclosed and claimed is an improvement upon the invention disclosed and claimed in the copending application of Luis W. Alvarez and Lawrence Johnston, Serial No. 523,878, filed February 25, 1944, Patent No. 2,555,101, dated May 29, 1951. As disclosed in said application, radar systems disposed at landing areas (either on land or on carriers) are provided and adapted to control and guide an aircraft during a blind landing or approach. The system disclosed and claimed in said application provides means whereby an idealized landing path is presented for comparison with the actual landing or approach path of a plane in flight. Thus suitable control signals may be communicated to the plane for correcting its course so that the actual approach or landing may conform to a safe approach or landing.

The system disclosed in said application is rather complicated. The system disclosed herein presents certain improvements which result in improved operation.

Referring to the drawings, Fig. 1 is a view partly in blocks showing the complete system;

Fig. 2 is a block diagram of the synchronizer;

Figs. 3 and 4 are block diagrams of the elevation and azimuth sweep amplifiers;

Fig. 5 is a perspective view of a portion of the antenna system;

Fig. 6 is a sectional view of the absorber unit for the antenna system;

Fig. 7 is a perspective showing the dipoles mounted in the wave guide;

Figure 8 is an elevation perspective of the variable wave guide used in the antenna system;

Fig. 9 is a sectional view showing certain portions of the variable wave guide;

Fig. 10 shows the aural unit; and

Figs. 11 and 12 show the screens of the indicator tubes under certain conditions.

General description of the system

The system herein is broadly divided into two portions, a search system and the control system proper. The search system for the most part is a conventional radar search system having a substantial range and adapted to scan a substantial region. Preferably the search system is adapted to scan the entire 360° in azimuth and may have any desired elevation characteristics. Thus for many purposes, the elevation range of the system may be of the order of about 10° or 15° above horizontal so that for all practical purposes substantially complete search coverage may be provided for incoming planes. The search system may present its data in any suitable fashion and, as shown, may present the rata on the screen of a cathode ray tube with the presentation being polar. In this form of presentation, the radius vector corresponds to range, while the angle corresponds to azimuth. The search system itself is not independent of the rest of the system as will be apparent later.

The control system proper consists of two directional antenna systems. One antenna system may cover a predetermined angular range in elevation, while the other antenna system may cover a predetermined angular range in azimuth. The two antenna systems are located close to each other, so that as far as any targets are concerned they may be considered to be coincident. Under normal conditions, the two fan-shaped lobe patterns from the plane-polarized antenna systems intersect at right angles in space with the controlled aircraft normally being disposed at the intersection of said antenna lobe patterns. The region of intersection of the two beams may be controlled at will by varying the azimuth of the elevation antenna system and the elevation of the azimuth antenna system, the two controls being inter-connected so that the patterns from the two antenna systems will continue to intersect. Each antenna system has electrical scanning means for insuring coverage of the angular sector by each system. Thus the elevation antenna may be an antenna producing a fan-shaped lobe having a comparatively small angular extent in elevation. The electrical scanning causes this lobe to move up and down so that the effective elevation coverage is extended to the desired value. The same applies to the azimuth antenna which, resembles the elevation system except that the plane of its fan-shaped lobe is perpendicular to the plane of the elevation lobe.

While each antenna might have a separate transmitter and receiver, and finally be related to each other so that the two operate as a composite system, it is preferred, for economy, to have certain portions of the radar system, namely transmitter and receiver, in common. Rapid switching of such transmitter-receiver combination between the two antenna, i. e. azimuth and elevation antennas, is necessary.

The echoes received by the azimuth and elevation antennas appear on separate azimuth and elevation, oscilloscopes. Actually, as illustrated in Fig. 1, each antenna is provided with two separate oscilloscopes, one being an expanded range oscilloscope, while the other is a long range oscilloscope. The details of the oscilloscopes and the manner of presenting the images of the echo signals may better be appreciated in connection with the description of the system as a whole.

The ground control approach system proper and the search system using plan position presentation (PPI) are inter-related in that the search system may select a particular range in which a target exists and make the selected portion of the range evident on the indicators of the ground control approach system proper. Thus the identity of the selected target is assured when passing from search to control. The control and search systems are keyed synchronously and in phase so that the exploratory pulses directionally transmitted by the antenna systems start simultaneously.

An ordinary communication system is tied in with the control system proper so that departures of actual glide or approach paths from desired safe paths may be communicated to the plane so that the plane may, either manually or automatically, correct its course in accordance with the transmitted information.

The search system generally

The plan position indicating search system generally comprises an antenna 10 (Fig. 1) connected through a T-R box 11 to a transmitter 12 and a receiver 13. Antenna 10 preferably is of the type having a generally fan-shaped beam, the plane of the fan being in a vertical plane, and, as will be explained later, is adapted to be rotated in azimuth through 360°. It is preferred to have the search system operate on a wave length sufficiently different from the control system to avoid mutual interference. The T-R box is any one of a number of electronic switches which alternately switches the transmitter and receiver to the antenna.

The transmitter is keyed at periodic intervals from a modulator 15 which is common to both the search and control systems. The modulator in its simplest form is a line pulse modulator which is controlled from a suitable timer or oscillator so that the modulator periodically supplies a sharp, high voltage pulse to transmitter 12. The modulation in this instance is merely a simple change from one voltage condition at the transmitter to another voltage condition, usually zero voltage to a sudden application of full voltage to the transmitter. Any type of modulating system may be used for modulator 15, and examples of modulators may be seen in pages 533 to 545 of Radio Engineers' Handbook by Terman (1943 edition), and page 291 of Ultra-High Frequency Techniques by Brainerd (1942 edition).

The transmitter itself may be any one of a number of well-known transmitters operating at a desired frequency. As is well known in radar systems, the transmitter is adapted to be pulsed for a short period of time and be inoperative for a longer period of time during which the receiver may receive reflected echoes. The receiver may also be one of a number of well known types, usually of the superheterodyne type. The receiver may be provided with a gain control 16. The receiver feeds its output through a line 17 to the control grid 18 of the plan position indicator cathode ray oscilloscope 20.

Because of more satisfactory resolution, it is preferred to use electromagnetic types of cathode ray tubes. However, it is understood that electrostatic types of tubes may be substituted therefor, in accordance with well-known practice. Tube 20, as shown, is of the electromagnetic type and is provided with focusing coil 22 connected to a direct current source not shown. In accordance with well-known practice, the intensity of the field due to focusing coil 22, as well as its orientation with respect to the cathode ray tube, may be varied in order to locate the rest position of a focused beam of electrons upon the center of the screen. In addition to focusing coil 22, the cathode ray tube is provided with a series of deflecting coils 23 for controlling the position of the beam on the screen. Since electromagnetic types of cathode ray tubes are well known in the art, a detailed showing of the coils is unnecessary. Thus a system of deflecting coils for an electromagnetic type of cathode ray tube is shown on pages 211 and 212 of the Brainerd book previously referred to. It is understood, of course, that rectangle 23 indicates a series of deflecting coils, usually two pairs of two coils each, and that the lines connecting these coils to the operating circuits do not necessarily show the number of wires actually used. Thus deflecting coils 23 are connected by lines 24 and 25 to search central system 26. Also cathode 27 and an anode 28 are connected by lines 29 and 30 to search central 26.

Antenna system 10, as has been previously indicated, is adapted to sweep over 360° in azimuth, and this is accomplished through a suitable drive motor 33. In order to convey azimuth data from the antenna system to cathode ray tube 20, a sine potentiometer 34 may be driven with the antenna. This is adapted to generate two sine waves 90° apart (a sine and cosine wave) whose instantaneous amplitudes are used for modulating two saw-tooth waves, which will give the azimuth angle of the antenna as measured from some fixed reference direction to the range sweep. Such devices are well known in the art. (See Fig. 272 of Radar Electronic Fundamentals, War Department, December 30, 1943, Technical Manual 11-466.) Sine potentiometer 34 feeds its output by cable 35 to search central 26, while a trigger impulse to the search central is provided by line 36 from a suitable timer or a synchronizing oscillator for the entire system which will be described later.

Search central 26 provides sweep voltages to the deflecting coils of the cathode ray tube and a positive beam-accelerating pulse to anode 28 so that the beam reaches the screen and becomes visible during the entire time of sweep. It is understood, of course, that the acceleration of the beam due to anode 28 may be controlled so that the beam is blocked except for the intensification due to the echo signals impressed on the control grid 18 by receiver 13. However, it is usually desirable to show the sweep trace faintly so that the instantaneous azimuth position of the system is visible.

If desired, faint marker traces may be impressed upon oscilloscope 20 by suitable circuits in search central 26 connected to anode 28. Such markers may show up as a series of concentric circles whose radii correspond to predetermined, fixed ranges. Antenna 10 produces a fan-shaped beam, the plane of the fan being in a vertical plane; it consists of radiating dipoles connected to a wave guide 40, which in turn is connected to a wave guide 41. Wave guide 41 terminates in a rotatable coupling joint 42 provided with flanges having choke sections; such joints are shown in Fig. 379, Radar Electronic Fundamentals, above referred to. To impart desirable radiation characteristics to antenna system 40, a suitable parabolic reflector 43 is provided. By proper design of the radiators and reflector, a relatively narrow, vertically polarized, fan-shaped beam is provided. The entire antenna system, as has been pointed out, is rotated so that complete azimuth scan is provided. The elevation angle of antenna 10 may be controlled by tilting the entire assembly. If desired, the antenna may be similar to the antennas used in the ground control approach system to be described in detail later and provided with a relatively fine, concentrated beam pattern but variable in elevation to give the desired coverage. Other types of antenna systems, including parabolic reflector systems or antenna arrays with reflectors and directors, may be used as desired.

The search system therefore represents a plan position indicating system, the pulse repetition rate of which is synchronized with the pulse repetition rate of the control system through modulator 15 which is common to both systems.

Control system

The control system comprises a synchronizer 50, (Fig. 1), elevation and azimuth antennas 51 and 52, together with various components of a complete radar system and particularly including a pair of elevation indicators, a pair of azimuth indicators and an error system. Synchronizer 50 includes a suitable timer 53 (Fig. 2) such as a blocking oscillator described in Fig. 11 of the co-pending application of Haworth and Purcell, Serial No. 531,826, filed April 19, 1944. This timer is conected, over a line 60, to modulator 15 which, as pointed out before, is a line pulse modulator. A line 61 connects the output of modulator 15 to a transmitter 62 of the control system. This transmitter may be any one of a number of ultra-high frequency type of transmitters utilizing magnetrons as sources of pulse energy. The output of transmitter 62 is connected through a wave guide and a T-R box 63 to a wave guide 64. Wave guide 64 terminates in a T section 65 leading to wave guides 66 and 67, respectively. Wave guide 66 energizes elevation antenna 51, while wave guide 67 energizes azimuth antenna 52.

Elevation antenna 51 scans in azimuth with the aid of a lever 70, which is under manual control, as will be explained later. The elevation angle of azimuth antenna 52 may be adjusted by means of a lever 71, as will be explained more in detail later. Azimuth and elevation scanning is made possible by introducing rotatable joints 72 and 73 in the respective wave guides, these joints being of the non-radiating type, such as joint 42 in the search antenna system.

Since one transmitter is common to both elevation and azimuth antenna systems, switching means are necessary to connect each antenna system in succession to the transmitter-receiver combination of the radar system. To this end, T section 65 is separated from the wave guide sections 66 and 67 by narrow gaps 74 and 75. Operating within the gaps 74 and 75 are a pair of metallic switch members 76 and 77, mounted on a common shaft and rotated by a suitable scanning motor 78. Metallic members 76 and 77 alternately enter the respective gaps 74 and 75 blocking communication between the undesired antenna and the transmitter-receiver combination.

The movement of reflecting members 76 and 77 need not necessarily be uniform. Thus it may be provided that member 76, for example, which is shown in a reflecting position may be snapped out quickly and member 77 be snapped into position quickly. Thereafter the reflecting member may be permitted to remain in position or possibly slowly turned, it being understood that the reflecting member is large enough so that it fills the gap until a further change in switching is desired. The action of the antenna switching is relatively slow. Thus each antenna system may be operatively associated with T65 for a time of the order of about $\frac{1}{10}$ of a second. In order to prevent detuning of the oscillator by substantial reflection back into the transmitter, it may be desirable to have one reflecting member entirely free of the gap before the other reflecting member is introduced. Thus some power may be wasted but oscillator stability will be maintained. Other methods for alternate switching of the antenna systems may be utilized.

In the disclosed system a single transmitter-receiver combination is used in alternate succession first with the azimuth antenna and then with the elevation antenna. Also, the same receiver is used first with the azimuth oscilloscopes and then with the elevation oscilloscopes. Since the output of the receiver is connected all the time to the intensity grids 90, 91, 97 and 98 of all oscilloscopes over the parallel circuits described above, it becomes necessary to introduce additional circuits for disabling the azimuth oscilloscopes when the receiver is connected to the elevation antennas, and for disabling the elevation oscilloscopes when the receiver is connected to the azimuth antenna. Without these additional circuits, the elevation and azimuth antenna signals would be reproduced on the elevation as well as on the azimuth oscilloscopes, which would render the entire system useless because of the confusion of the elevation and azimuth signals on the screens of the elevation and azimuth oscilloscopes. These additional circuits comprise a "keying" system or a "gating" system which blocks and unblocks first the azimuth oscilloscopes and then the elevation oscilloscopes in alternate succession, and in synchronism and in phase with the alternate connecting of the receiver first to the elevation and then to the azimuth antennas. To accomplish this proper channelizing of the elevation and azimuth echo signals to their respective oscilloscopes, a constant intensity light source and a motor-driven light-chopper direct the emitted light first onto one photo-electric cell channel, and then onto the other. The outputs of these channels are used to block and unblock the azimuth and elevation oscilloscopes in the manner stated above. The light chopper is driven by the same constant speed motor 78 as the antenna switch 76—77, thus realizing the previously mentioned synchronous and co-phased operation of the two—the antenna and the oscilloscope switching systems.

The above-mentioned oscilloscope switching system also performs an additional useful purpose: it alternately increases and decreases the overall gain of the receiver 80 in synchronism and in phase with the alternate connection of this receiver to the azimuth and elevation antennas. This alternate gain control serves a very useful purpose by equalizing the amplitudes of corresponding echo signals in both the elevation and the azimuth channels in spite of the fact that the elevation and the azimuth antennas may not have equal gains, which is indeed the case. The antennas do not have equal gains because of the difference in the precision required in the azimuth and elevation data.

To accomplish this alternating and synchronous gain control, the outputs of the two photoelectric channels are impressed respectively on two direct current amplifiers. Since the outputs of the photo-electric cell channels are no more than two equal-amplitude, equal duration switching or keying signals, i. e. two rectangular waves 180° out of phase with respect to each other, they cannot be used directly for controlling the gain of the receiver, but must undergo a suitable amplitude change corresponding to the difference in the gain of the azimuth and elevation antennas. This is obtained by impressing one wave on one gain control channel and the other wave on the other gain control channel, adjusting the outputs of the two channels to the magnitudes having an inverse ratio to the ratio of the antenna gains, and controlling the gain of the receiver in alternate succession with these signals.

The oscilloscope switching system and the receiver gain control systems are described below.

The azimuth and elevation antennas are also connected through T-R box 63 to a receiver 80 of the ground control approach system, the output of this receiver being connected over a line 81 to synchronizer 50. The echo pulses, appearing in the output of the receiver, are impressed on a cathode follower 82 (Fig. 2) and the output of the cathode follower is impressed on the intensity grids of the two elevation and two azimuth oscilloscopes over a line 83, a junction point 84, a line 85, and blocking condensers 86 and 87 respectively. The left plate of condenser 86 is connected to a junction point 88 and thence through a conductor 89 to the control grids 90 and 91 of the elevation oscilloscopes 92 and 93. As indicated in the drawing, oscilloscope 92 may indicate a range of approximately ten miles, while oscilloscope 93 may indicate a range of approximately two miles. It is understood, of course, that these figures are merely exemplary and, if desired, one of these tubes may be eliminated entirely. In practice, however, tube 93, with its expanded range, enables an operator to have a more precise control of the gliding path of the approaching planes, while tube 92, with its longer range, insures adequate presentation of a long range for early flight control of the approaching planes.

Similarly, the right plate of condenser 87 is connected to a junction 95, and this in turn is connected by wire 96 to the control grids 97 and 98 of azimuth oscilloscopes 99 and 100.

Receiver 80 is also connected to synchronizer 50 over a conductor 105. This connection controls the gain of the receiver by controlling the voltage on some or all of the receiver amplifier tubes.

Gain control line 105 from the receiver goes through a pair of separate, direct current amplifiers 106 and 107 (Fig. 2) within synchronizer 50. In other words, the direct current potential under the control of amplifiers 106 and 107 determine the potential of gain control line 105 so that the condition of amplifier 106 or 107 determines the gain of receiver 80.

It is clear that direct current amplifiers 106 and 107 cannot both simultaneously exercise control over the gain of receiver 80. Actually, direct current amplifier 106 controls the gain of receiver 80 during the time that the azimuth portion of the control system is operating, while amplifier 107 controls the gain of the receiver during the time that the elevation portion of the system is operating. Thus the gain at the receiver, which may be set independently for either azimuth or elevation indication purposes, is alternately controlled as elevation and azimuth switching is effected. To accomplish this, direct current amplifiers 106 and 107 are connected to lines 108 and 109, respectively, these lines entering synchronizer 50 from an elevation-azimuth commutator system designated as 110 (Fig. 1). Commutator 110 consists of a light source 111 which is adapted to shine on two photo-electric cells 112 and 113 respectively. Between the light source and the photo-electric cells, shutter discs 114 and 115 may be disposed, these being on a common shaft 116 mechanically connected so that they are driven from antenna motor 78. As illustrated in Fig. 1, the two shutters 114 and 115 alternately cut off the photo-electric cells and are timed so that the commutating action in switch 110 is synchronized with the antenna switching action of the antenna switch 76—77. Thus, as shown in the drawing, azimuth antenna system 52 is operatively connected to the transmitter-receiver system. Correspondingly, shutter 115 shuts off light from azimuth photo-electric cell 113. As soon as the elevation antenna system is connected to the transmitter-receiver combination, shutter 114 will simultaneously be cut in between light source 111 and elevation photo-electric cell 112. The outputs of photo-electric cells 113 and 112 are suitably amplified and fed to cathode followers 117 and 117a, respectively. These cathode followers thus feed lines 109 and 108, respectively, into synchronizer 50.

Line 108, which may have suitable isolating, amplifying or cathode follower stages within synchronizer 50 as desired, feeds line 120 coming from synchronizer 50 and going to junction point 95. When the azimuth indicators are to be energized, a positive potential is impressed on the control grids 97 and 98 of the azimuth indicators to overcome the normally negative potential impressed on these grids which blocks the beams. As shown in commutator 110, azimuth photo-electric cell 113 has its light source cut off so that it does not generate any potential. Thus this lack of potential may, by suitable amplifier stages, be transformed into a positive potential at control grids 97 and 98 of azimuth indicators 99 and 100. When the azimuth indicators are cut off, by light reaching azimuth photo-electric cells 113, the potential generated by this cell will result in a negative potential impressed upon control grids 97 and 98 of the azimuth indicators to cut the beam off. The design of such photo-electric control circuits is well known and within the reach of anyone skilled in the art, so that detailed description thereof is unnecessary. It is clear that elevation-azimuth commutator 110 may take a different form such as ordinary potentiometers driven by scan motor 78.

Line 109 similarly emerges, either in its identical form or as the output of isolating stages from synchronizer 50, as line 121 and goes to junction 88. Thus line 121 is the analogue of line 120 but controls the elevation indicators, i. e. controls the time when the beam is on or off.

D. C. amplifiers 106 and 107 have independent gain control circuits 122 and 123, respectively, these being in the form of potentiometers accessible to the operators. The gain controls may be applied to one grid of an amplifier tube, while the potential in the lead from the elevation-azimuth commutator may be applied to another grid of an amplifier tube. In other words, D. C. amplifier 106 may, for example, consist of a tetrode coincidence tube followed, if desired, by further direct current stages of amplification. An example of a direct current amplifier which may be used is given on page 376 (Fig. 15a) of Terman's book previously referred to.

As has been previously pointed out, synchronizer 50 has within it a timer 53 (Fig. 2) for pulsing all the transmitters of the entire system. This timer may feed a suitable isolating stage, such as an amplifier stage 125, and the output thereof may supply line 60 with trigger pulses of a predetermined polarity such as, for example, positive trigger pulses. Timer 53 also may feed isolating stages, including a cathode follower 126, and provide trigger pulses of a polarity opposite to that in line 60, such as, for example, negative trigger pulses, such pulses being applied to line 36. This line is adapted to supply trigger pulses to the various sweep circuits, including search central 26 with its sweep circuits.

Timer 53 is also the original source for range marks on the control cathode ray tubes. Thus cathode follower 126 may feed trigger pulses to a range marker circuit 130 adapted to supply range marks for the two-mile sweeps. Range marker circuits are well known in the art and may consist of shock-excited ringing oscillators having a predetermined frequency with the output of the oscillator feeding suitable amplifiers and clippers to provide voltage pips at predetermined distances apart on a calibrated range sweep. Thus a ringing oscillator such as described on page 189 of the Radar Electronic Fundamentals book may be used, together with squaring, peaking and clipping circuits as described on pages 166 to 183, inclusive, of the Radar Electronic Fundamentals book. The generation of range marker pulses in an indicating system for a radar system is old and is shown, for example, in the co-pending application of Paul F. Brown, Serial No. 517,896, filed January 11, 1944, Patent No. 2,454,132.

Range marker circuit 130 may itself feed a second range marker circuit 131 to supply markers for the ten-mile sweep ranges. This circuit may simply consist of a count-down multivibrator system to provide, as an example, one range marker on the ten-mile sweep for every four or five or any other desired number of markers on the two-mile sweep. Such circuits are well known and are described, for example, on page 219 of the Radar Electronic Fundamentals book. See also the co-pending case Whitham and Hite, Serial No. 512,930, filed December 4, 1943, Patent No. 2,444,890, dated July 6, 1948.

Range marker circuits 130 and 131 feed their range marker output pulses through blocking condensers 133 to 136, inclusive, to four output lines numbered 140 to 143, inclusive. Lines 140 and 141 go to cathodes 145 and 146 of the two and ten-mile elevation oscilloscopes 93 and 92, respectively. Lines 142 and 143 go to corresponding cathodes 147 and 148 of the azimuth oscilloscopes. It is clear that any range markers shown on the screen of the oscilloscope as beam intensification spots would require momentary, negative pulses on the cathodes.

Means are also provided for impressing movable identification markers on the control and search indicators so that the same target for both search and control may be identified. To this end, line 150 branches off from line 29 from search central 26 and goes into synchronizer 50. Line 150 may go through various amplifiers, if desired, and may be fed through a cathode follower stage 151 and through blocking condensers 152 and 153 to the ten-mile elevation and azimuth cathode leads 141 and 143. It is, of course, possible to feed these same identification markers to the two-mile indicators. This, however, is hardly necessary since it is unlikely there will be more than one target on such an expanded range. Means for impressing such an identification marker are well known in the art and resemble variable range markers. Thus a circuit for generating a movable range marker is shown in the co-pending case of Garman and Stafford, Serial No. 522,937, filed February 18, 1944, Patent No. 2,573,070 granted October 30, 1951; and while this circuit is shown as applied to an electrostatic type of cathode ray tube, its application to an electromagnetic type having a polar type of presentation is well known in the art. It is understood that suitable manual means under the control of the search operator may be provided for generating a marker in proximity to a selected target echo or even a pair of markers on each side of a target echo, the target echo being bracketed on the range axis between such markers. Such marker pulses of negative polarity may be applied to the cathodes of the indicators.

There is also provided a means for generating a marker line on the control indicator for showing a predetermined direction line on the azimuth oscilloscope and a predetermined elevation line, such as the ground line, on the elevation oscilloscope. Thus, for example, as will be explained later, it is desirable to present on the screen as an intense trace a line showing the location of the ground on the elevation oscilloscopes and some line having a fixed bearing with reference to the runway on the azimuth oscilloscopes. To provide this information, a pair of leads 156 and 157, fed from suitable means to be later described, provide voltages whose polarity and magnitude are a function of the instantaneous position of the control antenna beams as controlled by the scanning motor 78. In other words, leads 156 and 157 give indications of the instantaneous beam elevation of the elevation antenna 51 and beam azimuth of the azimuth antenna 52. This information may be fed either directly or indirectly through suitable means to one-kick multivibrators 159 and 160. Such multivibrators are well known in the art, and an example of one is given in Fig. 226 of Radar Electronic Fundamentals.

Since the scanning action due to motor 78 is relatively slow, the beam from each antenna system may dwell on a desired point for a substantial period of time as compared to the duration of each pulse of high frequency energy emitted by the transmitter. Thus, for example, if the pulse repetition frequency of the system is about 1500 per second, and the scanning movement is something of the order of one-half to one complete scan per second, then it is possible for each of multivibrators 159 and 160 to remain in their unstable position for a period of about ⅕ of a second before kicking back to their normal position.

If the elevation and azimuth antennas are switched back and forth at the rate of about ten times per second, it will be possible to show up the ground and other lines on the oscilloscopes irrespective of the phase relation between the scanning movements of the two antennas and the switching between the azimuth and elevation antennas. It is understood, of course, that any other time may be chosen, and since the cathode ray tubes preferably have long persistence screens, it may be possible to cut the time of multivibrators 159 and 160 down to between ⅕ of a second and ¹⁄₁₀ of a second or even lower. Each of the multivibrators is equipped with variable control for controlling the voltage at which the multivibrator will kick off. Hence it is possible to adjust each multivibrator so that it will kick off when the corresponding antenna system is at a desired setting.

Multivibrator 159 feeds its output through blocking condensers 161 and 162 to the elevation oscilloscope lines 140 and 141, while multivibrator 160 feeds its output through blocking condensers 163 and 164 to the azimuth oscilloscope lines 142 and 143.

It is understood that the circuit for feeding the outputs of the range markers, identification marker and multivibrator pulses to the various cathode leads is merely diagrammatic. Actually, as is evident from the drawing, it will be necessary to put in some isolating stages between some or all of the various blocking condensers and the lines to the indicators to prevent undesired feed into other lines. Thus, as an example, isolating stages such as cathode followers providing one-way transmission only may be provided between blocking condensers 161 and 162, as one unit, between blocking condensers 163 and 164 as another unit and between blocking condensers 152 and 153 as a third unit. In this way a range marker pulse from circuit 130, for example, may pass through blocking condenser 133 to line 140 and will be prevented from going beyond blocking condenser 161. Similarly, marker pulses through blocking condenser 134 would go to line 142 and would be prevented from digressing through blocking condenser 163. Inasmuch as such isolating one-way valve systems are old in the art, no definite showing is deemed necessary. The various arrowheads shown in Fig. 2 are considered to include suitable one-way transmitting circuits.

In Figs. 3 and 4, line 36 supplies trigger pulses originating in timer 53 to elevation sweep amplifier system 170 and azimuth sweep amplifier system 171. Referring first to system 170 (Fig. 3), there are provided two sweep systems for the ten-mile and two-mile oscilloscopes, respectively. Line 36 connects through lead 173 to one-kick multivibrators 174 and 175. A multivibrator of this type is shown in Fig. 228 of the Radar Electronic Fundamentals book. Thus multivibrator 174 is adjusted so that it generates a gate of about 22 microseconds for the two-mile oscilloscope range. Similarly, multivibrator 175 provides a gate of about 111 microseconds for the ten-mile range. It is understood that the gate duration is determined by the range. With electromagnetic oscilloscopes, it may also be necessary to provide some additional time to overcome initial self-inductance. Thus starting the oscilloscope coil current a short time ahead of the energy from the antenna when magnetic control is used is well known and may be provided in various ways.

Multivibrator 174 may feed a positive gate to cathode follower 176 connected to oscilloscope anode 177a to generate a beam. Multivibrator 174 also controls sweep generating circuits 177 and 178 whose outputs may be fed through cathode followers 179 and 180 to the deflecting coils of the two-mile oscilloscope. The two-sweep generators are necessary to provide the two components for controlling the beam direction. The actual amplitude of sweeps must be controlled in accordance with the elevation of the antenna pattern. To this end, elevation line 156 is connected in to sweep generator systems 177 and 178. The connection to generator 178 may be through a phase inverter 181.

Sweep generators 177 and 178 as controlled by elevation angle potentials may resemble the variable amplitude sweep generators described on page 58 et seq. of Radar System Fundamentals. It will be understood by those skilled in the art that the indicators 92, 93, 99, and 100, as well as search indicator 20, include suitable power supply circuits for energizing the cathode ray tubes and focusing, intensifying, and controlling the initial position of the electron beams. Since such circuits are complex and very well known, they are, for the sake of simplicity, not illustrated. Examples of common circuits of this type are shown in Fig. 303, page 497, of "Principles of Television Engineering" by Donald G. Fink, and on pages 553 and 556 of "Television" by Zworykin and Morton. The idea of generating two sweeps whose amplitudes vary sinusoidally so that rotary movement of radial beam sweeps will result is well known. The systems of this type, when applied to radar, are known as plan position indicating systems, or PPI. It is also possible to mechanically turn the magnetic deflecting coils and have a simple sweep generator of constant amplitude which also produces the PPI presentations. In the oscilloscopes of the control system, the actual angles from the antenna systems are multiplied in a non-linear or eccentric manner and the point of origin of the sweep is displaced from its normal control position to the one which is along the periphery of the screen, as illustrated in Figs. 1, 11 and 12. It is evident that the steady space current of cathode followers 179, 180 flowing through the vertical and horizontal deflection coils will displace the origin of the sweeps toward the periphery of the screen of tube 93, and the origin of the sweeps of the other indicators will be displaced similarly. Of course, other conventional means such as the beam positioning controls shown in Fink and in Zworykin and Morton, supra, may be utilized to position the electron beams as indicated in Figs. 1, 11 and 12. Thus the movement of the range sweep is shown as covering an angle of about 60° whereas the actual antenna beam movement may be ⅓ or ¼ of that. The mechanical movement of the oscilloscope deflecting coils could be multiplied through gearing providing the drive is of eccentric type so that the amplitude is non-linear. The motor of the corresponding antenna system would naturally be used to control the deflecting coil movements.

Because of the rapidity of the sweeps in the two-mile range, clamping tubes may be necessary to stabilize voltages at the ends of the sweeps in preparation for a new cycle of operation. Such expedients are well known in the art.

Multivibrator 175 controls the ten-mile oscilioscope in a corresponding manner so that a detailed explanation is unnecessary.

In Fig. 4, sweep amplifier system 171 resembles system 170 of Fig. 3, except that azimuth angle line 157 supplies the amplitude controlling voltage.

The non-linear control of the saw-tooth waves and the synchronization of this control with the angular positions of the azimuth and elevation antennas is described later in the specification.

*Control antenna system*

The antennas used in the control portion of the system may take on a variety of forms. Thus it is possible to provide substantially point sources such as one or more dipoles at the focus of a paraboloid for each of systems 51 and 52. For elevation antenna 51 it would then be necessary to move the paraboloid through a limited vertical angle so that the beam from the paraboloid may cover a predetermined elevation range, such as about 10° as an example. In addition thereto, an operator control through arm 70 would adjust the azimuth of the antenna. Similarly, azimuth antenna 52 might be moved over an azimuth range by a suitable motor, while arm 71 would be used to control the elevation.

It is preferred, however, to use an antenna system consisting of an array of dipoles set in a variable width wave guide. Such an antenna system is disclosed and claimed in the copending application of Luis W. Alvarez, Serial No. 509,790, filed November 10, 1943. In this system it is understood that the dipoles may be replaced by open apertures through which energy may issue. Also several parallel series of dipoles may be provided.

The preferred antenna system has desirable radiation characteristics, and a brief description of the system is herewith given in connection with Figs. 5 to 9, inclusive. Referring, therefore, to these figures, a wave guide 200 having a variable width is provided. Wave guide 200 may consist of a generally U-shaped base member 201 having side portions 202 and 203, respectively. This base member may be formed of any suitable material such as brass, aluminum or even steel. If made of steel, it is preferred to have the active wave guide surfaces plated with a good conducting metal such as copper or silver. Portion 201 of the wave guide may have an upstanding flange 205 which functions as a reflector and is disposed at a predetermined distance behind an array of dipoles 206, as shown.

Disposed within wave guide 200 is a generally L-shaped movable structure 210 having an upstanding portion 211 forming one of the narrow dimensions of the movable wave guide. Base member 201 has a corresponding flange 212 cooperating with flange 211 to determine the remaining narrow guide dimension. Each of these flanges 211 and 212 are provided with slots 213 throughout their length. Movable member 210 is maintained at a fixed, spaced relationship with member 201 by any suitable means such as a pair of rollers 215, so that small gaps between flanges 211 and 212 on the one hand and the long wave guide sides determined by members 201 and 210 on the other hand are formed. As shown in the drawing, the gaps are exaggerated, and in practice they would be something of the order of several thousandths of an inch.

The combination of gap plus slot provides a substantially half-wave length path from the interior of the wave guide to the bottom of each slot 213. Thus a choking action is created tending to confine the radiant energy to the interior of the wave guide. Such chokes are described and claimed in the co-pending application of Salisbury, Serial No. 489,844, filed June 5, 1943, Patent No. 2,451,876, dated October 19, 1948.

It is clear that L-shaped member 210 may be moved perpendicular to the long dimension of the wave guide, i. e. horizontally as seen in Fig. 9. Means for moving member 210 may consist of a toggle arrangement comprising toggle arms 220 and 221 pivoted respectively on the fixed and movable portion of the wave guide system. A draw bar 222 may be pivotally mounted to open or close the toggle as the case may be and thus control the width of the wave guide. It is understood that in practice the wave guide system may be something of the order of between 5 and 10 feet long with the toggle operating means repeated at suitable intervals. In order to maintain movable member 210 in proper position, a spring 225 carrying a roller 226 may be provided at suitable intervals, the roller bearing on member 210 so that the system is maintained in position. Scan motor 78 is adapted to drive draw bar 222 through a suitable cam, it being understood that the drive is so arranged that the variation of guide width follows a predetermnied pattern depending upon the characteristics of the entire system.

Carried in main guide member 200 are a series of dipoles 228 (Fig. 7). These dipoles may be formed in any suitable manner and, as shown here, may consist of a hollow, cylindrical body 229, the upper portion of which may have two diametral slots 230. At right angles to the diameter joining the slots are fingers 231 and 232 forming the dipole radiating elements proper. Finger 231 is merely fastened to the outside of body 229 at the upper end thereof, while finger 232 actually goes through this body and may be fastened thereto if desired and continues to a central rod member 233 extending down through body 229 and into the wave guide region. The proportion of the various elements including slots and fingers depends upon the wave length used, it being understood that slots 230 function as chokes so that fingers 231 and 232 may be oppositely poled. The general construction of the dipoles may be as shown or they may be constructed as disclosed in the co-pending application of R. W. Wright, Serial No. 511,868, filed November 26, 1943, or the application of L. G. Van Atta, Serial No. 507,585, filed October 25, 1943, Patent No. 2,486,620.

As clearly indicated in Fig. 7, adjacent dipoles are mounted so as to be effectively spaced about one-half wave length apart, the exact one-half wave length spacing being present when the beam from the antenna array is directed substantially straight ahead. It is clear from the drawing that adjacent dipoles are reversed so that in spite of the one-half wave length separation, the feed for adjacent dipoles is in phase.

A large reflector 240 may be provided at a suitable distance from the array of dipoles 228 and flange 205 so that the entire antenna system has highly directional characteristics. It is understood that as the dimension of the wave guide varies, the effective spacing between adjacent dipoles departs from one-half wave length and thus results in the beam being bent away from the direction normal to the plane of the array. The size of large reflector 240 and its position are such that it reflects energy emitted from the dipole array under all conditions.

Energy from the transmitter may be fed in at one end of the wave guide system, and in order to prevent undesired reflection back to the transmitter, a suitable absorbing means at the remote end of the wave guide system may be provided. Such absorbing means is shown in Fig. 6 and may consist of a wave guide section 241 carrying within it a mixture 242 of suitable absorbing material such as sand and aquadag maintained in place by some insulating sheet 243. It is preferred to have insulating sheet 243 inclined at an angle and retain the absorbing medium in this position so that reflection from the absorbing load may be eliminated. Cooling fins 245 may be provided to dissipate heat. The entire absorber may be suitably mounted upon the end of the wave guide system by means of a choke flange coupling 246.

At the input end of the wave guide system, it is necessary to provide a transition section for joining the variable wave guide portion with the fixed wave guide of the system. To this end, a plate member 250 (Fig. 8) pivoted at 251 may be provided separate from but generally as a continuation of movable guide member 210. Plate member 250 is provided with flange 252 with choking slot 253 generally in line with the corresponding flange and slot in movable guide member 210. A lever arrangement 255 connects movable member 210 with plate 250 so that the latter tends to pivot on pin 251. It is clear that the wave guide at the end of the system, namely adjacent pin 251, has little variation in dimension so that a fixed wave guide 257 may be fastened thereto. Fixed wave guide 257 goes down to rotary joint 72 or 73 as the case may be.

As has been previously pointed out, it is necessary to provide an indication at both the synchronizer and the sweep amplifier systems of the position of the beam or pattern from the antenna system due to the variation of wave guide dimension. While a simple potentiometer arrangement might be provided, the potentiometer being driven from motor 78 which drives movable guide member 210, it is preferred to provide the arrangement disclosed herein. To this end, a variable condenser 260 is connected in parallel to a fixed grounded condenser 261. In series with condenser 261 is another condenser 262. A radio frequency oscillator 263 supplies radio frequency voltage to condenser 262 and parallel condensers 260 and 261. A rectifier 264 is connected across parallel condensers 260 and 261 and feeds the instantaneous, rectified potential to a cathode follower 265 and thence to line 156. This varying direct current voltage, representing in electrical terms, the angular position of the elevation lobe with respect to the horizontal line, is impressed on the cathode follower 265, and the output of the latter is impressed over conductor 156 on the sweep circuits 177—178 and 177a—178a, furnishing the necessary sweep voltages for the stationary deflection coils of the 2-mile and 10-mile elevation oscilloscopes, where it varies the amplitudes of the sweep voltage waves to produce the types of presentations illustrated in Figs. 1, 11 and 12. The same system with primes is provided for the azimuth antenna.

Variable condenser 260 is mechanically coupled to an oscillating arm 222 connected to and oscillated by the elevation antenna 51 and the plates of this condenser are so cut that there is a predetermined variation of capacitance with the angular rotation of the elevation antenna. By properly proportioning the various condensers and their characteristics, it is possible to obtain in line 156 or line 157, as the case may be, a rectified voltage whose amplitude and polarity, although the latter is not essential, have any desired relationship to the position of the movable guide member. In the disclosed system the condenser is shaped to impress a radio frequency voltage to produce a display on the oscilloscope screens having uniform magnification (approximately 3 to 10 times) for all distances measured in a specified direction no matter what part of the display pattern is used. The specified direction in this case is the direction substantially at right angles to lines 363 and 369 illustrated in Figs. 11 and 12.

With this type of magnification, if the X-axis is made to coincide with the line 363 or 369, the magnification will be along the Y-axis. Since the cursor arms are moved along the Y-axis, and the magnification along the Y-axis is made uniform for all distances (i. e. range distances) no matter what part of the range is used, the response of the error indicators is uniform over the entire range. To illustrate: a distance of one millimeter along the Y-axis as measured on the oscilloscope screen will correspond to, say, 5 feet distance in space along the azimuth or elevation lobe irrespective of range. Because of this type of magnification the error meters and the potentiometers have uniform graduations.

It has been pointed out that elevation antenna system 51 may be adjusted in azimuth, and conversely azimuth antenna system 52 may be adjusted in elevation. In order for the entire system as a whole to operate, it is essential that the radiation patterns from these two antenna systems intersect in space at the target.

In order to obtain this relationship, elevation antenna system 51 has an arm 70 which is mechanically connected through a suitable linkage and chain system to a pair of foot pedals 270 at the azimuth indicators, the mechanical connections shown by dotted lines. Since the azimuth indicators are the only indicators in the whole system which give azimuth, it is necessary that the azimuth position of antenna system 51 be under the control of the azimuth operator. This operator is naturally at the azimuth indicator. Foot pedals 270 are also mechanically tied to a cursor 271 suitably pivoted so as to sweep over the outside face of the two-mile oscilloscope screen.

Similarly, a cursor 272 on the ten-mile scope screen is provided. These cursors are simply strips of material, preferably translucent, such as Celluloid or Lucite, and may have engraved thereon two lines, as shown, forming a small angle. By suitable calibration, it is possible to have cursors 271 and 272 aligned with a target echo being received by the system. This alignment, of course, depends upon the alignment of elevation and azimuth antenna systems and initially would require some fixed echo upon which the entire system could be trained. By suitable mechanical linkage, cursors 271 and 272 may be moved in proper relation to elevation antenna system 51 so that antenna system 51 is aimed at a target indicated as being within the angle marks on the two cursors 271 and 272. Thus as a desired target echo varies in azimuth, assuming it is within the range of azimuth system 52, the operator at the azimuth indicators can keep the elevation antenna system 51 properly trained.

Conversely, the operator at the elevation indicators is provided with foot pedals 275 mechanically linked to azimuth antenna 52 and controlling the elevation thereof. These foot pedals are also connected to control elevation cursors 276 and 277.

*Error indicating system*

It is desirable to provide means for indicating the departure of the actual glide path or approach path taken by a plane under control of the system from a prescribed or desirable glide path. To this end, means are provided for indicating departure from azimuth of the actual path as compared to the desired path, and means are also provided for indicating a dangerous elevation. To provide azimuth error indications, the azimuth operator may have an error control hand wheel 280 mechanically linked to error cursors 281 and 282 on the azimuth indicators and an error potentiometer 283. Like the antenna control cursors, error cursors 281 and 282 are merely strips of flexible, translucent material suitably pivoted and may have a guiding line etched or inscribed down the length of the cursor. The selected plane target appearing on the azimuth indicators is followed by moving the error cursors so that the center thereof passes through the target echo. It is understood, of course, that the antenna cursors 271 and 272 are similarly controlled so that the selected target echo is correctly disposed with relation thereto.

Upon operation of error hand wheel 280, potentiometer 283 is varied, and this in turn controls an aural unit 285. This aural unit contains means whereby a note of increasing pitch is generated as the difference between the plane azimuth and the desired azimuth increases. In order to distinguish positive or negative azimuth differences, the note may be broken up to consist of a series of dots or dashes. The means for accomplishing this may take on a variety of forms. As shown in Fig. 10, potentiometer 283 may have one line 286 going to control grids 287 and 288 of a pair of vacuum tubes 289 and 290. Vacuum tube 289 has its anode 291 connected to a suitable source of B+ potential, while its cathode 292 may be connected through a junction point 293 to the high side of a load resistor 294 and thence to ground. It is understood, of course, that the other terminal of control potentiometer 283 is grounded to complete the circuit, and that a suitable source of potential is included.

Vacuum tube 288 has its cathode 298 grounded, while anode 299 may be connected through a load resistor 300 to a suitable source of B+ potential. Anode 299 may be directly connected to control grid 301 of a D. C. coupled amplifier tube 302. Tube 302 has its anode 303 connected to a suitable source of B+ potential, while its cathode 304 is connected to the high side of load resistor 294. Junction 293 may be connected to a relaxation type of oscillator 306.

A simple form of relaxation oscillator useful in this system is shown in Fig. 35d, of page 515 of Terman's Radio Engineers' Handbook. In an oscillator of this type, as the potential of junction 293 rises, the frequency of the oscillator rises since the control grid of the gas tube reaches the firing point more quickly. Other types of oscillators may be used. A gas tube type of oscillator is only responsive to voltage increases of one polarity, say positive if impressed upon the grid. Hence the system of tubes 289, 290 and 302 converts variation of potentiometer voltages in 283 into positive voltage changes.

In order to take account of the sign of the error azimuth angle, the line to control grid 287 is extended to control grid 310 of a vacuum tube 311 having a cathode 312 suitably grounded. Tube 311 may have its anode 313 connected through a multivibrator 315 to a suitable source of B+ potential. Thus tube 311 is adapted to function as a switch in response to positive voltages and complete the multivibrator energizing circuit. Multivibrator 315 preferably operates at a slow rate such as one cycle per second. The output of multivibrator 315 may be fed through a blocking condenser 316 and combined with the output of relaxation oscillator 306 to junction point 307. The combined output is fed into control grid 308 of a cathode follower tube 308a whose anode 309 may be connected to a suitable source of B+ potential. Cathode follower tube 308a has its cathode 309a connected through a suitable load resistor 399b to ground, and the output at the cathode may be taken along line 316.

Line 316 may go to the modulating portion of the transmitting part of a communication system 318 which may have communication with incoming planes. It is clear that as potentiometer 283 is varied the aural signal unit may be controlled as above indicated to communicate to the plane an indication of the azimuth thereof. If the plane is coming in at the correct azimuth for the path portion of the approach, potentiometer 283 will be at an intermediate position so that the output of line 316 may be a series of dots, each dot being a low-pitched sound. If the azimuth of the plane departs from the desired value, the pitch will increase. On one side of the desired azimuth, the pitch will be continuous, whereas on the other side the pitched note will be broken up into a series of dots. If desired, means may be provided such as by a blocking condenser to increase the intensity of the output in line 316 with increase in pitch frequency.

At the elevation indicators, the operator is provided with an error hand wheel 320 mechanically connected to error cursors 321 and 322 on the elevation oscilloscopes and also connected to an elevation error potentiometer 323. It is understood that the elevation operator will operate hand wheel 320 to keep the cursors aligned with the desired plane target and in doing so will vary the position of potentiometer 323. Potentiometer 323 is connected by a line 324 to aural unit 285. Line 324 may go to control grid 325 of a gas-filled triode 326 whose anode 327 is connected to ground through an alternating source of potential 328. Gas triode 326 has its cathode 330 connected by line 331 to a warning light 333 in a visual error indicating panel 334 (Fig. 1). It is understood, of course, that potentiometer 323 is connected through to cathode 330 of the gas triode to complete the circuit, and the showing here is diagrammatic. By properly setting potentiometer 323, any desired elevation glide path may be chosen to trip warning light 333. Thus if a glide path below a minimum elevation is set as the minimum path, then potentiometer 323 may be so poled that a positive potential is impressed upon control grid 325 of gas triode 326 to cause breakdown. As long as the grid remains above firing potential, lamp 333 will glow. As soon as potentiometer 323 is changed to reduce grid 325 below its firing potential, then alternating supply 328 will permit tube 326 to again resume control.

While no automatic means for communicating to the plane are shown in the event that warning light 333 glows, it is understood that such may be provided. Thus the break-down of gas tube 326 may set into operation a predetermined warning signal in the aural signal unit for transmission through the communication system 318. However, in order to avoid confusion with the azimuth signal system, a suitable telephone at the elevation operator's position may be provided so that the elevation operator may orally warn the pilot of the incoming plane.

In the event that the signal to be transmitted from the communication system 318 to the incoming plane is to control automatic apparatus in the plane rather than put the pilot on notice, then it is clear that means may be provided under the control of elevation error potentiometer 323 for sending out proper signals. Thus it may be possible for elevation error potentiometer 323 to control a system broadly similar to azimuth aural system by operating in an entirely different frequency range. Thus, as an example, the azimuth error portion of the system might operate over an audio-frequency range from about 25 cycles per second to 250 cycles per second. The elevation portion of the system might operate from about 1500 cycles per second to about 3,000 cycles per second. Commutating means may be provided to alternately switch the azimuth and elevation portions of the system to communication system 318. Thus the commutator could operate to switch the azimuth portion of the aural unit to communication system 318 for three seconds and then connect the elevation portion of the aural system for succeeding three seconds. Other combinations are possible.

In order that an operator may have a visual indication of error difference between the actual and desired glide path, meters 350 and 351 may be connected to lines 286 and 324, respectively, so as to indicate azimuth and elevation error. These meters are merely voltmeters to indicate the position of potentiometers 283 and 323 and may be calibrated in any manner desired. Thus azimuth meter 350 may be calibrated in terms of angle, while elevation meter 351 may also be calibrated in terms of angle. It is thus possible for an operator or a traffic director to have the error panel in front of him containing the two error meters and warning lights, and communicate verbal directions to an incoming plane. Thus the complexity of the aural system may be eliminated, if desired.

*Indicator markings*

Figs. 11 and 12 show markings as they might appear on the various control indicator tubes. The search indicator oscilloscope (not shown) will merely shown conventional plan position indications with range markings, namely radial sweeps which may or may not be visible by themselves but which will show up targets as bright spots. As the search antenna system rotates in azimuth, the sweep within the indicator oscilloscope will also rotate.

Referring to Figs. 11A and B, the drawing shows the face of the ten-mile elevation and azimuth oscilloscopes, respectively. In each case, points 360 represent the start of the sweeps and thus indicate the location of the control equipment. Lines 361 and 362 represent respectively the negative and positive angles of elevation scanned by the elevation antenna, while 363 represents the horizontal ground line. Echo 364 may represent a hill or similar target, while the other spots therein may indicate various targets. Thus spots near the maximum elevation boundary 362 may represnt planes, while spots near the horizontal line 363 may represent trees or the like.

Referring now to Fig. 11B, lines 367 and 368 represent the extreme boundaries of the azimuth angle scanned by the azimuth antenna, while line 369 may represent a line of predetermined azimuth such as a line parallel to runway 370. Target echo 364 is the same as in the preceding figure and shows the azimuth of the hill. Remaining targets may show incoming planes. The series of equi-distant, parallel lines may indicate range markers. Thus with the ten-mile range, these markers may be about one mile apart. An identification marker line 371 in both oscilloscopes may be placed there by the search operator to indicate a plane taken under control from the search system.

Referring now to parts C and D of Fig. 11, the numbers there indicate the corresponding sweep lines as in Figs. A and B, it being understood, however, that C and D show the two-mile oscilloscopes. In order to get a bearing in azimuth, an artificial target such as a suitable reflector may be disposed so that the target echo shows as spot 375 in Fig. D. Thus the operating system may be calibrated for azimuth, this being particularly important of the two-mile oscilloscope. The alignment of the ten-mile azimuth oscilloscope need not be so precise.

Figs. 12A and B are simplified showings of the azimuth oscilloscopes illustrating the azimuth alignment, the numbering there corresponding to that in Figs. 11B and 11D, respectively.

During the operation of the entire system, an incoming plane may first be picked up by the search system. When this plane is at a predetermined azimuth, elevation and range, it may be passed on to the control system, the plane being identified by the range marker generated in the search system and shown on the search and control indicators. Once the control system has taken control of a plane, the azimuth, elevation and range may be accurately indicated and directions may be given to the plane. Thus at the azimuth station, the foot pedal for controlling the azimuth of the elevation system is manipulated in such a manner that the corresponding cursor on the azimuth tube is properly positioned about the target echo. Similarly, the error cursor is manipulated by the hand wheel. The same procedure at the other indicator tube is carried out.

It is clear that the intersection of the error cursor and ground line at the elevation tube will give the landing point and also indicate the glide angle. Similarly, the intersection of the error cursor and azimuth marker line parallel to the runway may determine an azimuth limit. Thus the indicators furnish instantaneous, visible data showing the position of the plane and also whether or not the glide path of the plane is suitable. A separate operating position at the control tower in a traffic control station for an airfield may have the error panel with the error meters and warning light.

What is claimed is:

1. A radar system having elevation and azimuth radar channels having directional elevation and azimuth antennas respectively, means for impressing exploratory pulses on said antennas, elevation and azimuth cathode ray tubes each tube having a screen connected to the respective antennas, and for indicating target echoes, means for oscillating each antenna through a limited sector, the sector of the elevation antenna being in elevation, and the sector of the azimuth antenna being in azimuth, first means at the elevation tube for controlling the elevation of said azimuth antenna, and second means at the azimuth tube for controlling the azimuth of said elevation antenna whereby said two scanning sectors may be caused to intersect on a common target.

2. The system as defined in claim 1 wherein each tube is provided with a manually movable cursor on the face thereof, said cursor being manually moved to follow a selected target indication, and means for connecting said cursor and the respective antenna for moving said antenna to direct its radiation pattern on the selected target.

3. The system as defined in claim 1 which also includes a radio communication channel an error cursor movably mounted on the face of each tube, said error cursor following the selected target indication on the respective screen, first and second means controlled by the movement of the respective cursor, said first and second means generating respective error signals corresponding to the position of said error cursor, and connections between said communication channel and said first and second means for controlling the intelligence signal transmitted by said communication channel.

4. The system as defined in claim 1 wherein at least one indicating tube is provided with an error cursor movably mounted on the face thereof, manually operated means for making said error cursor to follow a target indication, means controlled by said manually operated means for generating error signals, and an error indicator connected to said last means for visually indicating the departure of the actual path of the selected target from a predetermined path.

5. A radar system having elevation and azimuth channels having respectively elevation and azimuth directional antennas, elevation and azimuth cathode ray tubes each having a screen, means for producing a sector of plan position indication of target echoes on each screen, and additional means for maintaining the center of said sector off the center of said screen, means at each antenna for scanning a limited sector in azimuth with said azimuth antenna, and a limited elevation sector with said elevation antenna, means at the elevation tube for controlling the elevation of said azimuth antenna, and means at the azimuth tube for controlling the azimuth of said elevation antenna whereby said two scanning sectors may be caused to intersect on a common target.

6. The system as defined in claim 1 in which said azimuth channel includes a full range azimuth tube and a vernier range azimuth tube, and said elevation channel includes full range and vernier range elevation tubes.

7. A radar system as defined in claim 1 in which said first and second means are two cursors movable over the faces of the elevation and azimuth tubes respectively to follow the image of the selected target on said screens, and instrumentalities operated by said cursors, for pointing said azimuth and elevation antennas at said selected target.

8. A radar system including a directional antenna, means for periodically impressing an exploratory pulse on said antenna, means causing said antenna to scan a limited angle, a cathode-ray tube having a screen, a sweep generator initiating a sweep in timed relation to said pulse, deflecting means for said tube, said deflecting means being connected to said generator for producing a polar indication in terms of said angle and range of objects producing echoes of said pulse, means connected to said tube to locate the polar origin of said sweeps substantially away from the center of said screen, circuits within said sweep generator for angularly expanding said polar indication, and an antenna angle synchronizing means interconnecting said antenna and said sweep generator, whereby the polar presentations on said screen have a predetermined angular relation to the angular position of said antenna.

9. A radar system as defined in claim 8 in which said circuits within said sweep generator have amplifying means for angularly expanding said polar indication, said amplifying means having parameters to produce a substantially uniform magnification measured in a direction at substantially right angles to a predetermined radius of said polar presentation for all ranges and angular positions of said antenna.

10. A radar system including a directional antenna, scanning means for oscillating said antenna, a cathode-ray tube having a screen, beam-deflecting means and means for generating the cathode-ray beam; means connected to said tube for normally positioning said beam substantially at the periphery of said screen, first and second sweep-generating means connected to said beam-deflecting means, said sweep means generating, respectively, first and second sweep voltages; and a source of varying direct voltage connected to said first sweep-generating means for controlling the amplitude of said first sweep voltage as a function of angular position of said antenna, said first sweep-generating means being responsive to said varying voltage to produce a substantially uniform uni-lateral magnification of all presentations on said screen.

11. A radar system as defined in claim 10 which also includes a mechanical coupling between said antenna and said source of varying direct voltage for making the amplitude of said voltage substantially proportionate to the angular position of said antenna with respect to a predetermined reference line for the oscillations of said antenna.

12. A radar system including a directional antenna; scanning means for oscillating said antenna; a cathode-ray tube having a screen, means for generating a cathode-ray beam, and beam-deflecting means; first and second sweep-generating means connected to said beam-deflecting means, said sweep means generating, respectively, first and second sweep voltages; a source of varying direct voltage whose amplitude is a function of angular position of said antenna with respect to a predetermined reference line for the oscillations of said antenna; and first and second connections between said source and said first and second sweep-generating means, respectively, for controlling the amplitudes of said voltages as first and second functions, respectively, of the angular position of said antenna, said first function having maximum limits greater than the maximum limit of said second function.

13. In a radio system, a cathode-ray oscilloscope including a cathode-ray tube having a screen, means for generating a cathode-ray beam, and first and second beam-deflecting means, first and second sweep-generating means connected respectively to said first and second beam-deflecting means, said sweep means generating, respectively, first and second sweep voltages, a source of varying direct potential, and first and second connections between said source and said first and second sweep-generating means respectively, said first connection including means to vary the amplitude of said first sweep voltage between zero amplitude and a predetermined maximum amplitude of one polarity only which is greater than the maximum amplitude of said second sweep voltage, and said second connection including means to vary the amplitude of said second sweep voltage between a maximum amplitude which is smaller than the maximum amplitude of said first voltage, and a minimum amplitude which is greater than zero.

14. In a radio system, a cathode-ray oscilloscope including a cathode-ray tube having a screen, means for generating a cathode-ray beam, and beam-deflecting means for deflecting said beam along two coordinates; said beam-deflecting means normally positioning said beam along the periphery of said screen; first and second sweep-generating means connected to said beam-deflecting means and generating, respectively, first and second sawtooth sweep voltages; a source of varying direct voltage connected to said first sweep-generating means, and means for successively varying the amplitude of said first sweep voltage in accordance with said varying direct voltage, while said second sweep voltage remains substantially constant.

15. A ground control approach system comprising a transmitter, elevation and azimuth antennas, first means for alternately connecting said antennas to said transmitter, a receiver, said first means alternately connecting said receiver to said antennas, azimuth-range and elevation-range oscilloscopes, second means for alternately connecting said oscilloscopes to said receiver, mechanically operated arms on the faces of said oscilloscopes to follow the positions of an image of a moving object reproduced on the screens of said oscilloscopes, and means for pointing said antennas at said object, said means being also connected to and operating said arms, whereby the positions of the arms determine the positions of said antennas.

16. A ground control approach system as defined in claim 15 which also includes a second set of arms on the faces of said oscilloscopes to follow the positions of said image, and a communication system transmitting intelligence signals to said object, said intelligence signals being controlled by said second set of arms.

17. A plan position indicating radar system including a receiver, a cathode ray tube connected to said receiver and having beam deflecting means and a fluorescent screen, means for the presentation of signals impressed on said tube by said receiver along polar coordinates on said screen, means coupled to said deflecting means for locating the polar origin of said presentation substantially at the periphery of said screen, and further means coupled to said deflecting means for expanding said polar coordinate presentation in the angular direction.

18. A plan position indicating radar system including a receiver, a cathode ray tube connected to said receiver and having beam deflecting means and a fluorescent screen, means for the presentation of signals impressed on said tube by said receiver along polar coordinates on said screen, means coupled to said deflecting means for locating the polar origin of said presentation substantially at the periphery of said screen, means for sweeping the electron beam radially from said origin substantially entirely across said screen, and further means coupled to said deflecting means for angularly expanding said polar coordinate presentation, whereby a given angle is represented by a larger angle on said screen.

CHALMERS W. SHERWIN.
LAWRENCE H. JOHNSTON.

REFERENCES CITED

The following references are of record in the file of this patent:

UNITED STATES PATENTS

| Number | Name | Date |
|---|---|---|
| 2,189,549 | Hershberger | Feb. 6, 1940 |
| 2,228,266 | Gray | Jan. 14, 1941 |
| 2,231,929 | Lyman | Feb. 18, 1941 |
| 2,241,809 | De Forest | May 13, 1941 |
| 2,412,702 | Wolff | Dec. 17, 1946 |
| 2,415,094 | Hansen et al. | Feb. 4, 1947 |
| 2,421,747 | Engelhardt | June 10, 1947 |
| 2,422,361 | Miller | June 17, 1947 |

FOREIGN PATENTS

| Number | Country | Date |
|---|---|---|
| 108,556 | Australia | Sept. 28, 1939 |